US011748346B2

(12) United States Patent
Cui et al.

(10) Patent No.: US 11,748,346 B2
(45) Date of Patent: Sep. 5, 2023

(54) MULTI-TENANT HOSTING OF INVERTED INDEXES FOR TEXT SEARCHES

(71) Applicant: Amazon Technologies, Inc., Seattle, WA (US)

(72) Inventors: Yilun Cui, Bellevue, WA (US); Neil Kulkarni, Seattle, WA (US); Sahil Palvia, Seattle, WA (US); Yuxiang Guo, Bellevue, WA (US); Rajesh Babu Srikakollu, Redmond, WA (US); Daiying Li, Seattle, WA (US); Arend Peter Castelein, Bellevue, WA (US); Lakshmi Anand, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 17/491,255

(22) Filed: Sep. 30, 2021

(65) Prior Publication Data

US 2023/0099061 A1  Mar. 30, 2023

(51) Int. Cl.
*G06F 16/245* (2019.01)
*G06F 16/23* (2019.01)
*G06F 8/77* (2018.01)

(52) U.S. Cl.
CPC .............. *G06F 16/245* (2019.01); *G06F 8/77* (2013.01); *G06F 16/2343* (2019.01); *G06F 16/2379* (2019.01)

(58) Field of Classification Search
CPC .. G06F 16/22; G06F 16/2228; G06F 16/2282; G06F 16/2343; G06F 16/2379; G06F 16/245; G06F 16/2455; G06F 16/24552
See application file for complete search history.

(56) References Cited

U.S. PATENT DOCUMENTS

| | | | |
|---|---|---|---|
| 9,760,620 B2 | 9/2017 | Nachnani | |
| 10,127,285 B2 | 11/2018 | Vuppala | |
| 10,565,273 B2 | 2/2020 | Meyerzon | |
| 11,106,734 B1 * | 8/2021 | Batsakis | G06F 16/2282 |
| 2005/0240595 A1 * | 10/2005 | Chandrasekaran | G06F 16/2246 |
| 2010/0198730 A1 * | 8/2010 | Ahmed | G06F 21/30 380/278 |
| 2017/0004323 A1 * | 1/2017 | Balachandran | G06F 21/6209 380/278 |
| 2017/0061151 A1 * | 3/2017 | Baessler | G06F 16/3331 |
| 2017/0249327 A1 * | 8/2017 | Gowdappa | G06F 16/1827 |
| 2021/0026561 A1 * | 1/2021 | Ginzburg | G06F 16/2272 |
| 2021/0157682 A1 * | 5/2021 | Antonopoulos | G06F 16/2379 |

\* cited by examiner

*Primary Examiner* — James E Richardson
(74) *Attorney, Agent, or Firm* — S. Scott Foster; Kowert, Hood, Munyon, Rankin & Goetzel, P.C.

(57) ABSTRACT

Multi-tenant hosting of inverted indexes for text searches is implemented. Text search requests are routed to different index nodes that cache inverted indexes for different user accounts. Updates to inverted indexes are routed to index nodes that have acquired a lock on an inverted index. The index nodes have access to a common data store that persistently stores the inverted indexes.

20 Claims, 9 Drawing Sheets

US 11,748,346 B2

MULTI-TENANT HOSTING OF INVERTED INDEXES FOR TEXT SEARCHES

BACKGROUND

Text search capabilities are useful to enrich user experiences of a variety of different systems or applications that store different documents or other data objects that include text information. Inverted indexes may provide an efficient search structure to locate data objects that include specific text in order to support text search capabilities. For example, a user interface may support text search requests to locate one (or more documents) that contain a phrase, which a user may wish to modify. An inverted index that indexes various documents may be evaluated in order to identify which document(s) contain the phrase.

Figure 1:
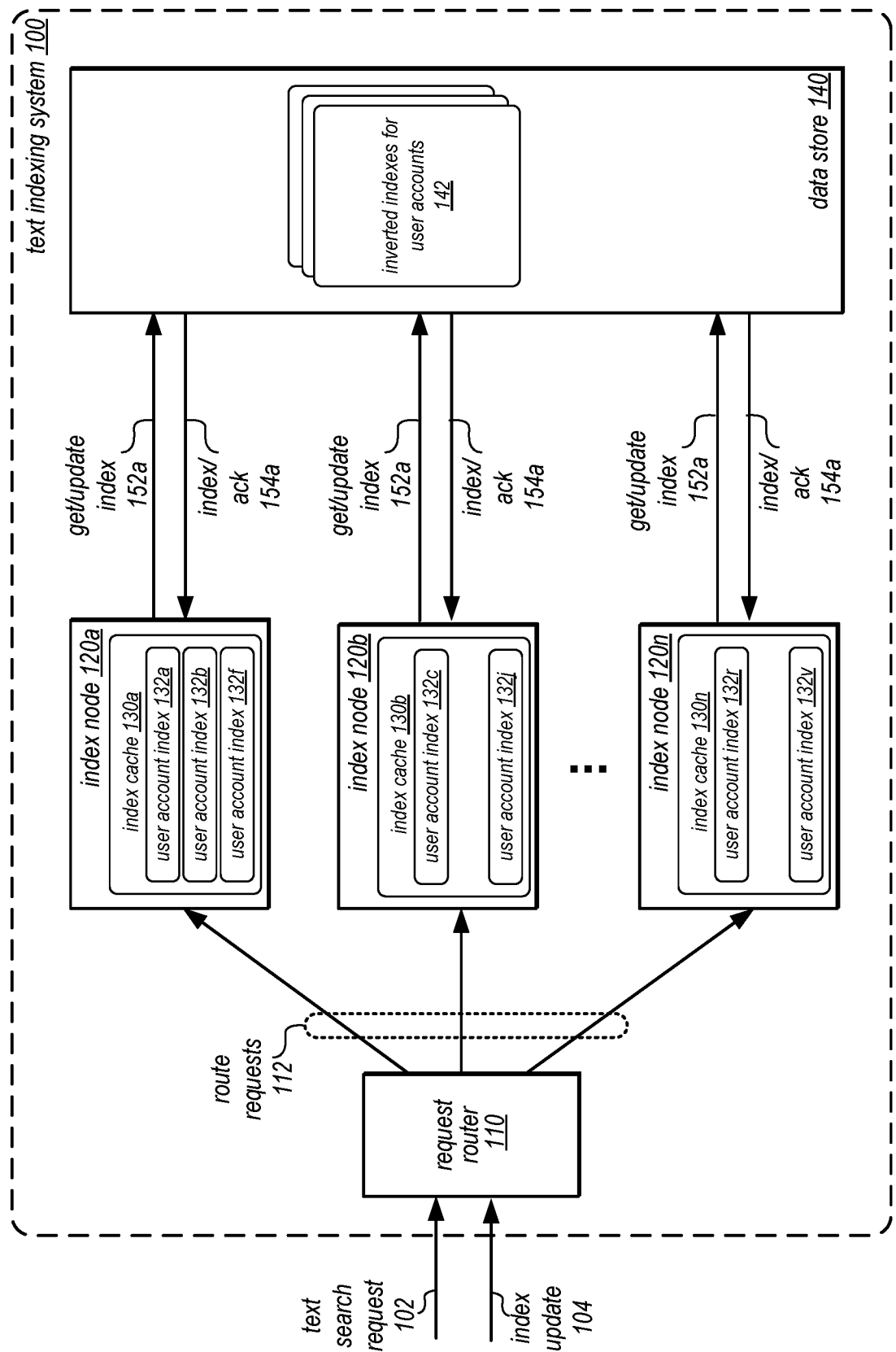
FIG. 1 is a block diagram illustrating multi-tenant hosting of inverted indexes for text searches, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for multi-tenant hosting of inverted indexes for text searches are described. Different systems or applications, such as an application development, build, delivery, and deployment service as discussed in detail below, may support text search features in order to locate different data objects that contain desired text. For instance, in a system like application development, build, delivery, and deployment, many different documents and other data objects including text may authored, updated, and utilized. In order to locate (and in some cases modify) these documents, a text search may be performed so that a user does not have to manually search each possible document.

Inverted indexes may be used in various embodiments in order to support text searches. An inverted index may describe an index data structure that identifies different words, phrases, or other text portions that may be included in data objects. For example, an inverted index can have different respective entries for each word (or phrase or other text portion) which may include a links, references, pointers, or other identifiers of data objects that include in the word (or phrase or other text portion). In this way, a text search feature can locate the corresponding entry (or entries) in the inverted index for the desired text (e.g., one or more words, phrases, or other text portion), and then return the documents identified in the entry.

Some systems, such as application development, build, delivery, and deployment service 210 (discussed below with regard to FIG. 2), may have large numbers of documents that are stored or otherwise hosted for a large number of different users. In order to support a text search feature, such systems may have to maintain inverted indexes corresponding to the different user accounts so that one user account's data is not included in or accessible to another user account. Moreover, different user accounts may have different numbers and/or sizes of data objects and may also have differing amounts of text searches performed. Such scenarios make it difficult to allocate a sufficient number of computing resources to support text searches without resulting in computing resource waste (e.g., causing energy waste, storage waste, and use of computing resources that could otherwise be used to perform other operations). For example, a technique that relies upon allocating separate computing resources to maintain and search inverted indexes for user accounts may over allocate computing resources for one user account and may not allocate enough computing resources for another user account. However, in various embodiments, techniques for multi-tenant hosting of inverted indexes for text searches, may be able to right-size the allocation of computing resources for maintaining and searching inverted indexes, preventing computing resource waste while preserving the confidentiality of user account data.

FIG. 1 is a block diagram illustrating multi-tenant hosting of inverted indexes for text searches, according to some embodiments. Text indexing system 100 may be a stand-alone indexing system used on behalf of other systems (e.g., document stores or other data repositories), and/or may be integrated as part of other systems, services, or applications, such as application development, build, delivery and deployment service 200 discussed below with regard to FIG. 2. Text indexing system 100 may support different requests to handle text search requests, such as text search request 102. For example, a text search request 102 may include desired text (e.g., which may be various words, phrases, or other portions of text and which may be human-readable text, such as text of a human language, or machine-readable text, such as various computer programming languages, scripts, codes, or other instructions). In the case of application development, build, delivery and deployment service 200, a text search request 102 could be a text search across different programming code files (which may or may not include human-readable language), or may be a text search across issues, which may be human readable text describing various problems, notes, or other information about programming code.

Text indexing system 100 may implement a request router 110 to determine which one of multiple index nodes 120 may be assigned and thus routed a request like text search request 102. Text indexing system 100 may implement a common data store, data store 140, which may store persistent copies of inverted indexes for different user accounts 142, which can then be accessed and cached at different index nodes 120. In this way, any index node 120 is capable of handling searches 102 or requests to update an index 104 by obtaining and/or updating inverted indexes for user accounts 142 in data 140.

Different caching strategies may be used in order to efficiently route requests 112 to different index nodes 120. For example, each index node 120, such as index nodes 120a, 120b, and 120n, may maintain a respective index cache, such as index caches 130a, 130b, and 130n. The contents of index caches 130 may be reported, in some embodiments, to request router 110 in order to make routing decisions (not illustrated), or a routing history may be used to route requests to an index node that previously handled a request. As discussed in detail below with regard to FIGS. 5-8, a locking technique may be implemented in order to route requests to those nodes that are performing an update to an inverted index first, and then to other index nodes. In some embodiments, index caches may use different eviction techniques, such as evicting (e.g., overwriting) a least recently accessed user account index in order to include the cache 130 another user account index.

As illustrated in FIG. 1, index nodes 120 may perform requests to get or update an index, as indicated at 152a, 152b, and 152n. For example, if search request is routed to an index node (e.g., index node 120a) that is associated with user account index 132c, and index node 120a does not currently cache user account index 132c, index node 120a may get 152a index 132c from data store 140, which may return the index 154a for index node 120a to use to perform the search request. For search requests with an already cached user account indexed (e.g., a search request for user account index 132j sent to index node 120b), no interaction with data store 140 may be performed.

Index update requests 104 may indications of changes, modifications, or additions of data that should be included in the inverted index for the corresponding user account of the changed data. For example, a change in a source code file or an added issue in application development, build, delivery, and deployment service 210 may trigger an index update 104, as discussed in detail below with regard to FIG. 5. Request router 110 may route the request 112 to an index node, such as index node 120n, which may obtain the corresponding user account index and make updates to both a cached and persistent index 142 in data store 120, such as by performing update index requests 152 and receiving a corresponding acknowledgment 154 if the update is successful.

Inverted indexes for user accounts in index caches 130a, 130b, and 130n, such as user account indexes 132a, 132b, 132f, 132c, 132j, 132r, and 132v, may be encrypted according to encryption schemes specific to the respective user account (e.g., according to a user account's encryption key). Likewise, the persistent versions of the user account inverted indexes 142 in data store 140 may also be encrypted in the same way (e.g., using the same key for the user account). In this way, one user account's inverted index data is encrypted separately from and is inaccessible to another user account (and vice versa). In this way, different user account inverted indexes can be moved back and forth between data store 140 and index nodes 120 without violating data confidentiality. Moreover, if inverted indexes are not frequently utilized they may not be maintained in an index cache node, allowing room for more frequently accessed indexes or larger indexes to be maintained for quick access in an index cache 130 (e.g., using an in-memory cache).

Please note, FIG. 1 is provided as logical illustrations of multi-tenant hosting of inverted indexes for text searches, and is not intended to be limiting as to the physical arrangement, size, or number of components, modules, or devices to implement such features.

The specification first describes an example network-based application development and delivery service that performs multi-tenant hosting of inverted indexes for text searches. Included in the description of the example network-based application development and delivery service are various aspects of the example network-based application, build delivery, and development service. The specification then describes flowcharts of various embodiments of methods for multi-tenant hosting of inverted indexes for text searches. Next, the specification describes an example system that may implement the disclosed techniques. Various examples are provided throughout the specification.

Figure 2:
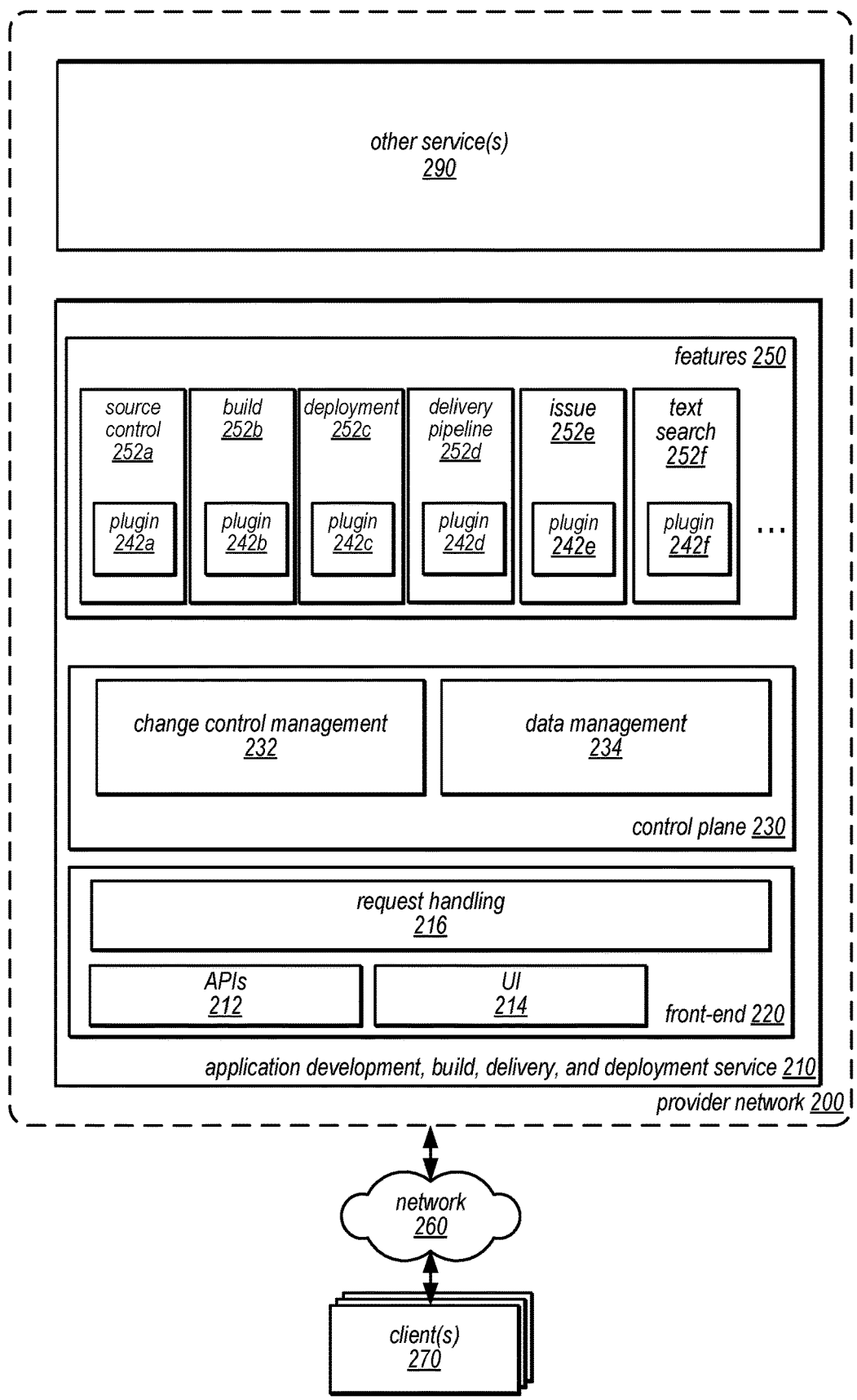
FIG. 2 is a block diagram illustrating a provider network that may implement an application development, build, deployment, and delivery service that implements multi-tenant hosting of inverted indexes for text searches, according to some embodiments.

FIG. 2 is a block diagram illustrating a provider network that may implement an application development, build, deployment, and delivery service that implements multi-tenant hosting of inverted indexes for text searches, according to some embodiments. Provider network 200 may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, may be attached to the overlay network so that when a client provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-6, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate may integrate with the tools to expose their functionality to end users. The platform services include a web UI 214 framework based on a micro-frontend architecture and a shared API layer. Application development, build, delivery, and deployment service 210 a data management system to facilitate data sharing across tools—and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications, text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance, as discussed in detail below with regard to FIG. 4.

As noted earlier, plugins may include plugins 242a, 242b, 242c, 242d and 242e, which may bused to access various development tools, such as features 250, including but not limited to source control 252a, build 252b, deployment 252c, delivery pipeline 252d, issue handling 252e, and text search 252f, which is discussed in detail below with regard to FIGS. 5-8. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for an interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced—in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252*f* may be a subscriber to various documents events that add, delete, or modify documents in order to make corresponding updates to inverted indexes.

Figure 3:
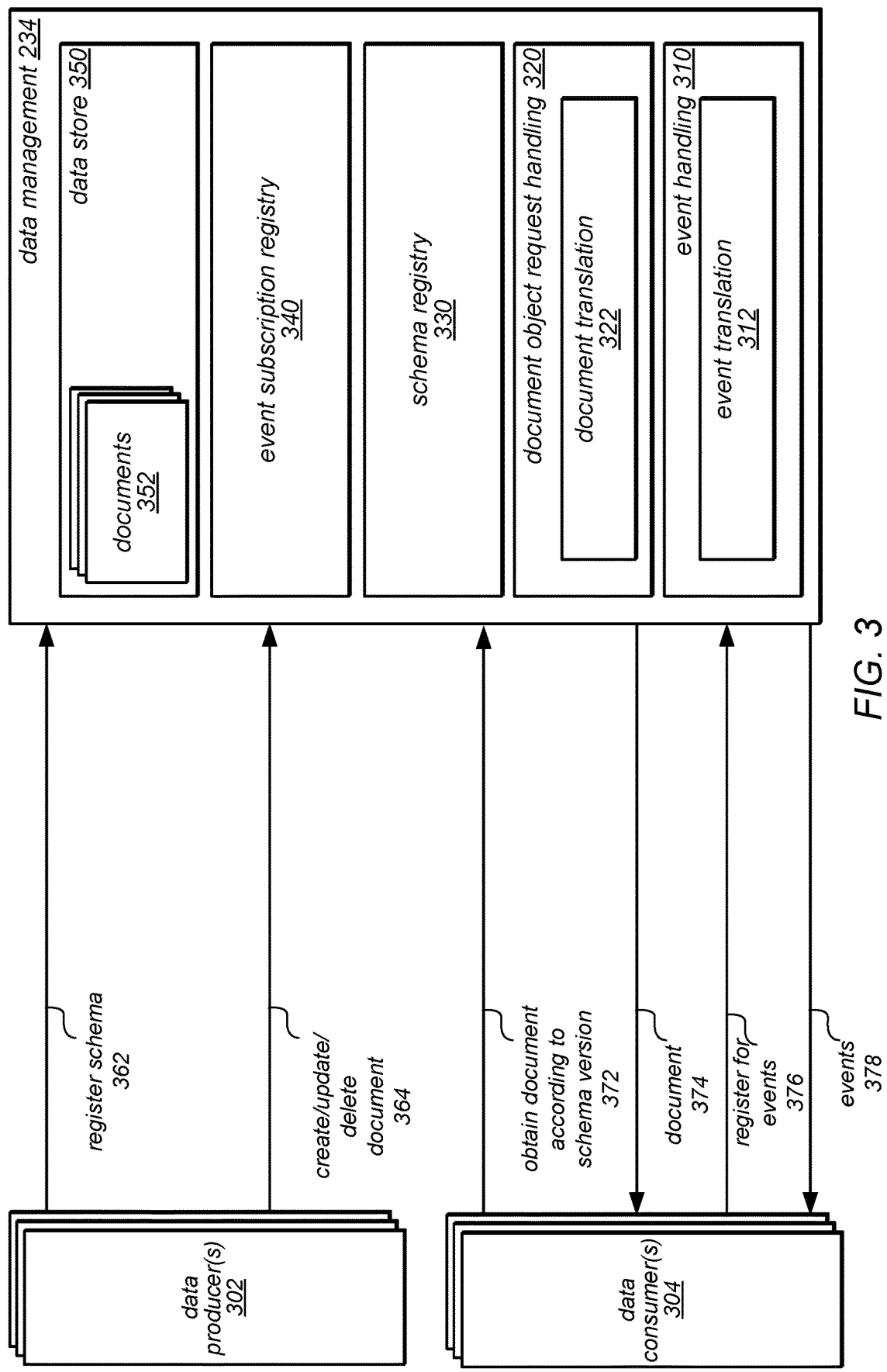
FIG. 3 is a block diagram illustrating data set management, according to some embodiments.

FIG. 3 is a block diagram illustrating an example data management system for the application development, build, deployment, and delivery service, according to some embodiments. Data management 234 may implement different types of request handling. Event handling 310 may perform event translation as part of handling different events. Document object request handling 320 may perform document translation 322 as part of handling different document object requests.

For example, document object request handling 320 may receive document update requests, such as update request (e.g., to create, modify, or delete a document object). Document object request handling 320 may send a request to get applicable schema version(s) from schema registry 330. Schema registry 330 may identify the applicable schema versions (e.g., from mapping information) or may identify them from identifiers in the request. Schema registry may return the schema version(s) to document object request handling. Document object request handling 320 may use the schemas to determine the update fails to satisfy the schema(s), such as failing to satisfy a current version of the schema. If so, then a rejection of the update as invalid may be sent. Document object request handling 320 may then send a request to data store 350 to update the document according to the request. Document object request handling 320 may also send a notification of an update document event to event handling 310.

Similar techniques to those depicted with regard to document update can be performed to create a new document. For example, a create document request can be received at document object request handling 320, which include information, such as a file (or location thereof), or other information used to create the document. Again, document object request handling 320 may get applicable schema version(s) 320 so that document object request handling 320 can determine which schema version to apply to create the document. For example, the document may one of many documents that are created according to the same schema. Which schema version is applied may correspond to which plugin (e.g., which tool or other feature) submitted the document creation request. Mapping information may, for example, be used to determine which schema version is applicable to which requestor. In some embodiments, the request itself may specify the schema version. Document object request handling 320 may then store the document to data store 350. An event may be triggered or sent to event handling 310.

Schema registry 330 may provide storage for different schema versions, translation instructions and other schema information. A request to register a schema 362 may be received. For example, an interface of a data management system, like data management system 234, may support registration requests (e.g., via API, graphical user interface, command line interface, and so on), in order to provide a new version of a schema (e.g., specified as a JSON or other script, programming code, or language) with an associated data object (e.g., a document or event stream). In some embodiments, the schema may include or link to instructions (e.g., scripts, programming code, or language) for translating between the version of the schema being registered and one or more prior versions of the schema (e.g., describing what data field was added, changed, removed, etc.).

The registration request may be rejected, in some embodiments, if the request or updated schema fails a validation technique, such as analysis indicating that the version of the schema fails to conform to various stylistic or other constraints on schemas (e.g., using invalid data types). A response indicating that the registered version of the schema is invalid may be returned.

The version of the schema may be added to a registry 330 for schemas for data objects, in some embodiments. For example, a database or other data storage system may store a schema as a document, file, or other object. A link, mapping, or other association may be updated to identify which data object(s) (e.g., event stream or document) the schema is applicable to (e.g., a version number, a schema identifier and data object identifiers).

Event subscription registry 340 may support storage for data consumers to register for events. Data store 350 may store data for data objects, such as documents 352 and event streams (not illustrated).

Data producers may submit various requests, including registering a schema 362, creating, updating, or deleting a document, as indicated at 364, creating an event stream, or submitting events. For example, data consumers may submit various requests and receive various responses, including requests to obtain a document according to a schema version, as indicated at 372, receive the document 374, register for events, as indicated at 376, and receive events, as indicated at 378. For example, document object request handling 320 may handle requests to obtain documents. Document object request handling 320 may get the applicable schema versions from schema registry 330. Document object request handling 320 may also get the document from data store 350. If translation should be performed, then translation instructions may be used and the document sent to the data consumer 304.

Similarly, in another example, events may be received either from their submission to data management 234 as part of an event stream or as an event related to a document update or creation (as noted above). Event handling 310 may send a request to get applicable schema(s) for the event to schema registry 330. Schema registry may identify the applicable schemas (e.g., based on mapping information) or may return those schema(s) identified in the request (e.g., by version and schema identifier). The schemas may be returned.

Event handling 310 may use the schemas to evaluate the validity of the event. If the event does not satisfy the schema(s), then it may be rejected. If valid, event handling 310 may send a request to event subscription registry to get subscribers for the event (e.g., subscribers to an event stream or document). Event subscription registry 340 may return the subscribers. Event handling 310 may determine, based on the subscribers, whether translation should be performed (e.g., does an event subscription have a schema version identifier matching the event, or an earlier schema). If translation should not be performed, then the event is sent. If translation should be performed, then translation may be performed using translation instructions between schemas and the translated event sent.

Figure 4:
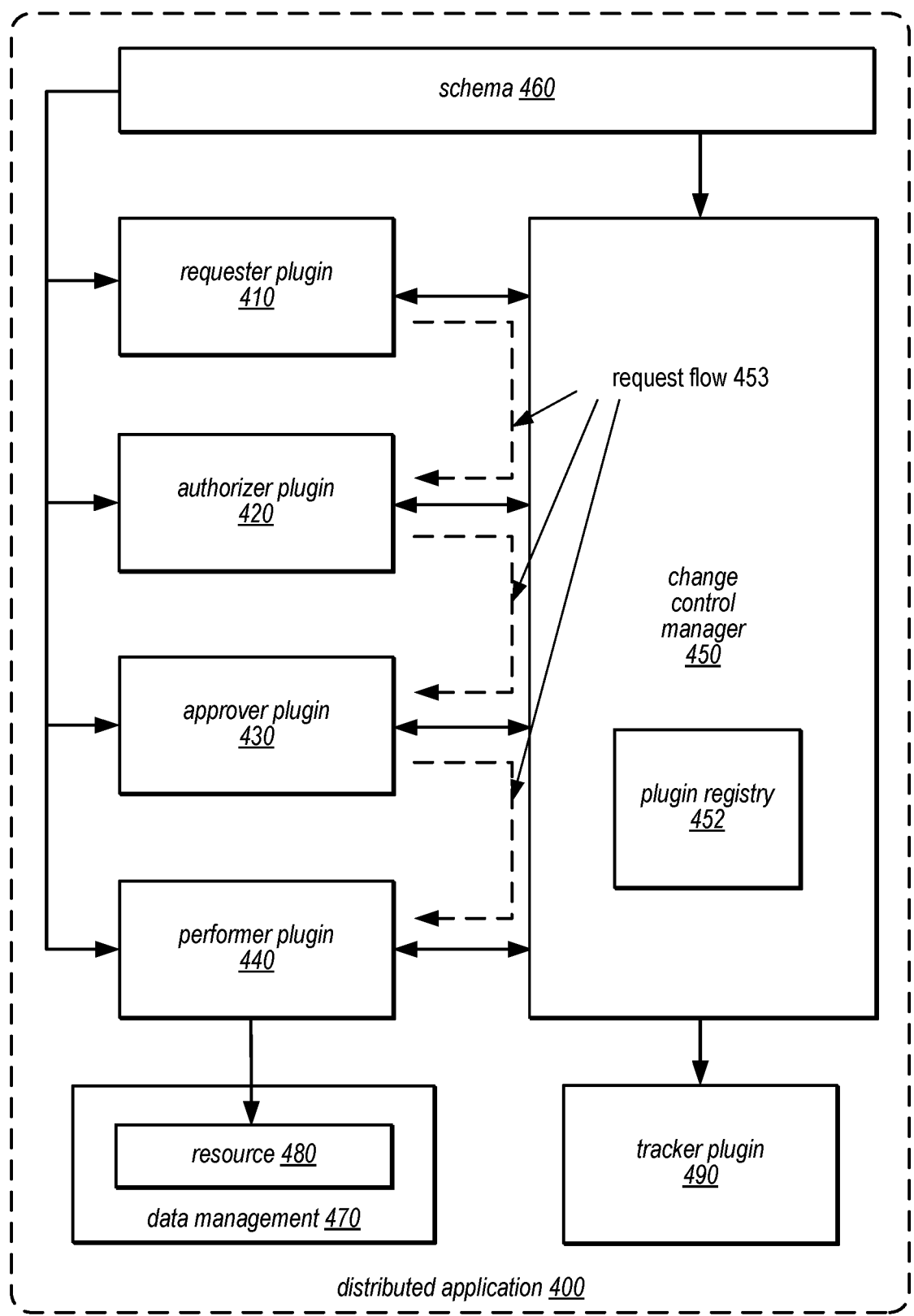
FIG. 4 is a block diagram illustrating change control management, according to some embodiments.

FIG. 4 is a block diagram illustrating extensible change control management, according to some embodiments. Distributed application 400, such as an application that utilizes various plugin components to integrate, support, and extend the capabilities of the distributed application 400, may include a change control manager 232 which may implement changes to a resource 480 stored in data management 234 using various plugins 410, 420, 430 and 440, in some embodiments, identified in plugin registry 452. Plugin registry 452 may be a registry for a single resource (or organized to group registered plugins by resource) in a data structure (e.g., table, index, etc.). The resource 480 may be of a particular resource type, with the resource type having an associated schema 460. Various change operations for the resource 480 may be encoded using the schema 460, and the various plugins 410, 420, 430 and 440 as well as the change control manager 232 may access the schema during communication of these operations.

A requester plugin 410 may submit requests for changes to the resource to change control manager 232. These requests for changes may follow a typical request flow 453. These requesters may, in some embodiments, provide various user interfaces (UIs) or Application Programming Interfaces (APIs) or other programmatic interfaces to allow users to submit change requests to the change control manager. In other embodiments, a requester plugin may perform other plugin roles for the resource of for other resources and may submit change requests as part of fulfilling other plugin roles. These examples, however, are not intended to be limiting, and any number of requester plugin implementations may be envisioned.

An authorizer plugin 420 may authorize or reject change requests submitted to the change control manager 232 by requester plugins. An approver plugin 430 may approve or reject change requests submitted to the change control manager 232 by requester plugins. A given resource may have any number of registered approver plugins in plugin registry 452, in various embodiments.

A performer plugin 440 may perform approved change requests submitted to the change control manager 232 by requester plugins. In some embodiments, a plugin may implement more than one plugin function for a resource or the same or different plugin functions for different resources. For example, in some embodiments, a plugin may implement both an approver plugin function as well as a performer plugin function for a resource, as discussed below. It should be understood, however, that some combinations of plugin functions may not be allowed, for example, a plugin implementing both a requester function and an approver function for the same resource. These examples, however, are not intended to be limiting and any number of plugin implementations may be imagined.

In addition, a tracking plugin 490 may receiving notifications of various events associated with the resource 480. A change performer plugin component 440 may advertise possible changes and reference the projected consequences to a resource 480 stored within data management 234.

For example, a performer plugin 430 may advertise a change to merge a pull request with the consequence that the tip of the destination branch will change. Change approver plugin 430 may be required to record approval in change control manager 232 before a change can proceed. For example, if it is desirable to use an advisory time window plugin, that plugin would have to approve changes to deployed environments before they are enacted—a time window plugin would reject changes that take place during an advisory period. Change approver plugins 430 can pre-approve a change where applicable. For example, when evaluating whether a user can merge a pull request, in most cases it is not necessary to wait for a user to actually request the merge to determine if it is allowed. Change requester plugin 410 may start the process of enacting a change.

These requester plugins could be client plugins that provide user interfaces (UIs) that make these requests on behalf of end users but they could also be feature plugins. For example, a delivery pipeline plugin (e.g., plugin 242d as shown below in FIG. 2) could be a change requester 410 and initiate changes to each target resource according to its orchestration rules instead of directly performing these changes itself. Finally, change performers 440 complete the process by enacting approved changes and recording the results in change control manager 232 and data management 234. Plugins may perform combinations of these roles, but it may be rare, in some scenarios, for a plugin to perform multiple roles for the same type of change—for example, it is not expected that a plugin will be an approver for its own changes.

Figure 5:
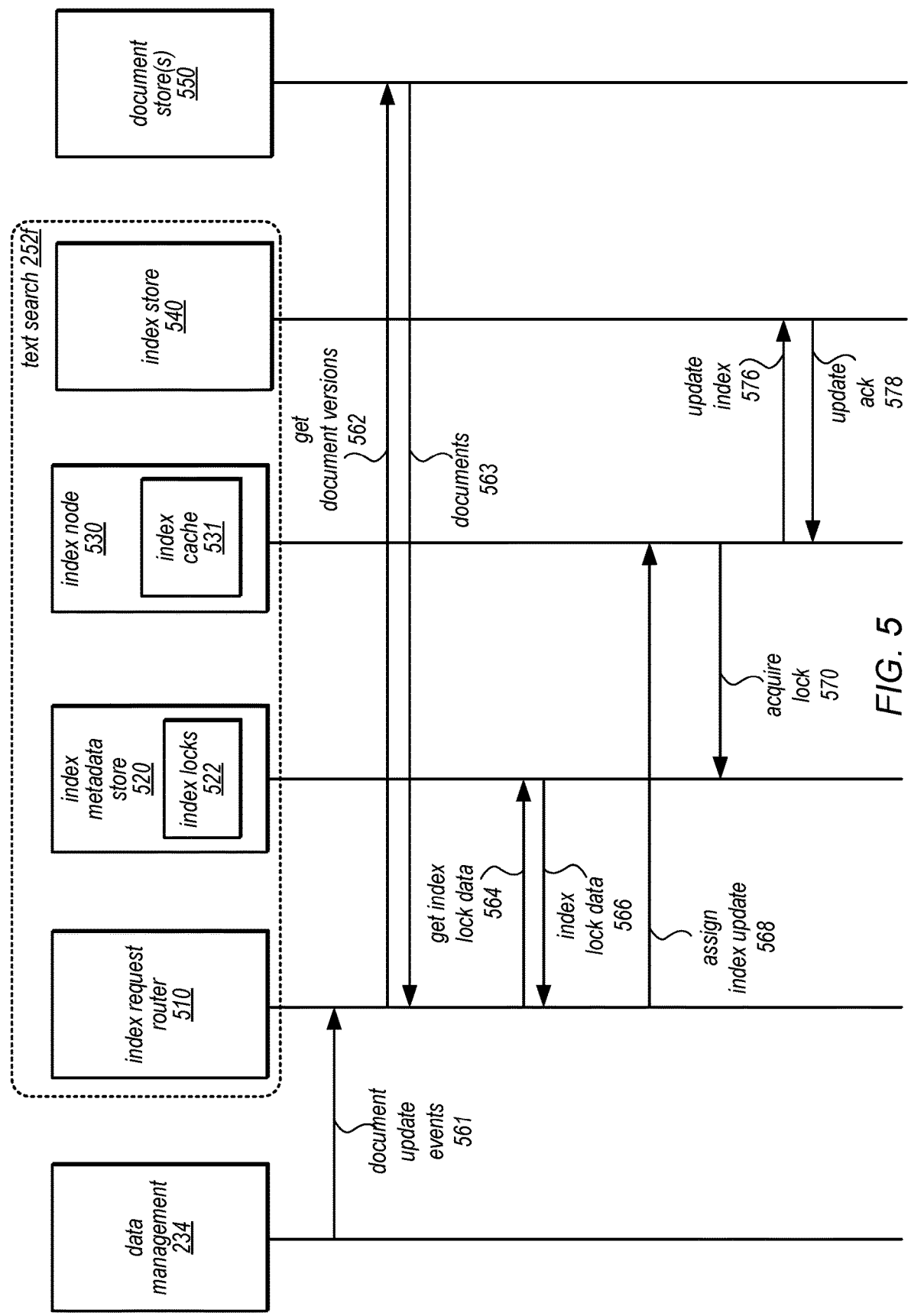
FIG. 5 is a sequence diagram illustrating updates to inverted indexes, according to some embodiments.

FIG. 5 is a sequence diagram illustrating updates to inverted indexes, according to some embodiments. Text search 252f may utilize architectural features similar to those discussed above with regard to FIG. 1, such as a fleet or group of index nodes, such as index node 530, which may maintain an index caches, such as index cache 531. A common index store 540 (which may be a data store implemented as part of application service 210 or as one of other services 290 (e.g., an object-based data store). Document store(s) 550 may be various tools 250 or other sources of information that store data, such as data for code repositories of source control 252a and/or issues 252e.

In various embodiments, text search 252f may utilize an index metadata store 520 (e.g., a database or other data store system) which may store metadata about the different inverted indexes for user accounts of application development, build, delivery, and deployment service. As part of metadata, index locks 522 may be stored, which indicate an index node that has acquired lock to update an index. Index request router 510 may receive a document update event 561. Index request router 510 may send a request to get 562 the document versions (e.g., from before and after the update) to document store(s) 550, which may return the documents 563. Index request router may also send a request to index metadata store to get index metadata, including lock data 520. The index lock data may be returned 566, which may indicate whether (or not) an index node has a lock on the inverted index to be updated for the document event. If not (or the lock is not valid as it has not been renewed or refreshed within a threshold amount of time), then index request router 510 may select an index node (e.g., according to various techniques as discussed below with regard to FIG. 8). In either case, one the index node has been identified (e.g., index node 530), index router 510 may assign the index update 568 to index node 530. Index node 530 may acquire the lock 570 (e.g., by writing to index locks 522 in index metadata store 520 an entry identifying index node 530 as the lock holder).

Index node 530 may perform a "diff" operation on received document versions 562 (which may be provided to index node 530 as part of assignment 568 or may be receive the results of the diff from index request router 510) to determine the difference and thus discover the changes made as a result of an update. In some embodiments, the update may be the addition of a new document in a user account, in which case there may not be different versions but just the new document that is obtained. Index node 530 may then determine the updates to the inverted index to be made (e.g., to add a new entry, or update existing entries with the words, phrases or other portions of text present). Index node 530 may update a cached version as well as perform an update request 576 to index store 540 in order to update the persistent copy of the inverted indexes for the user account and receive an update acknowledgement 578.

Figure 6:
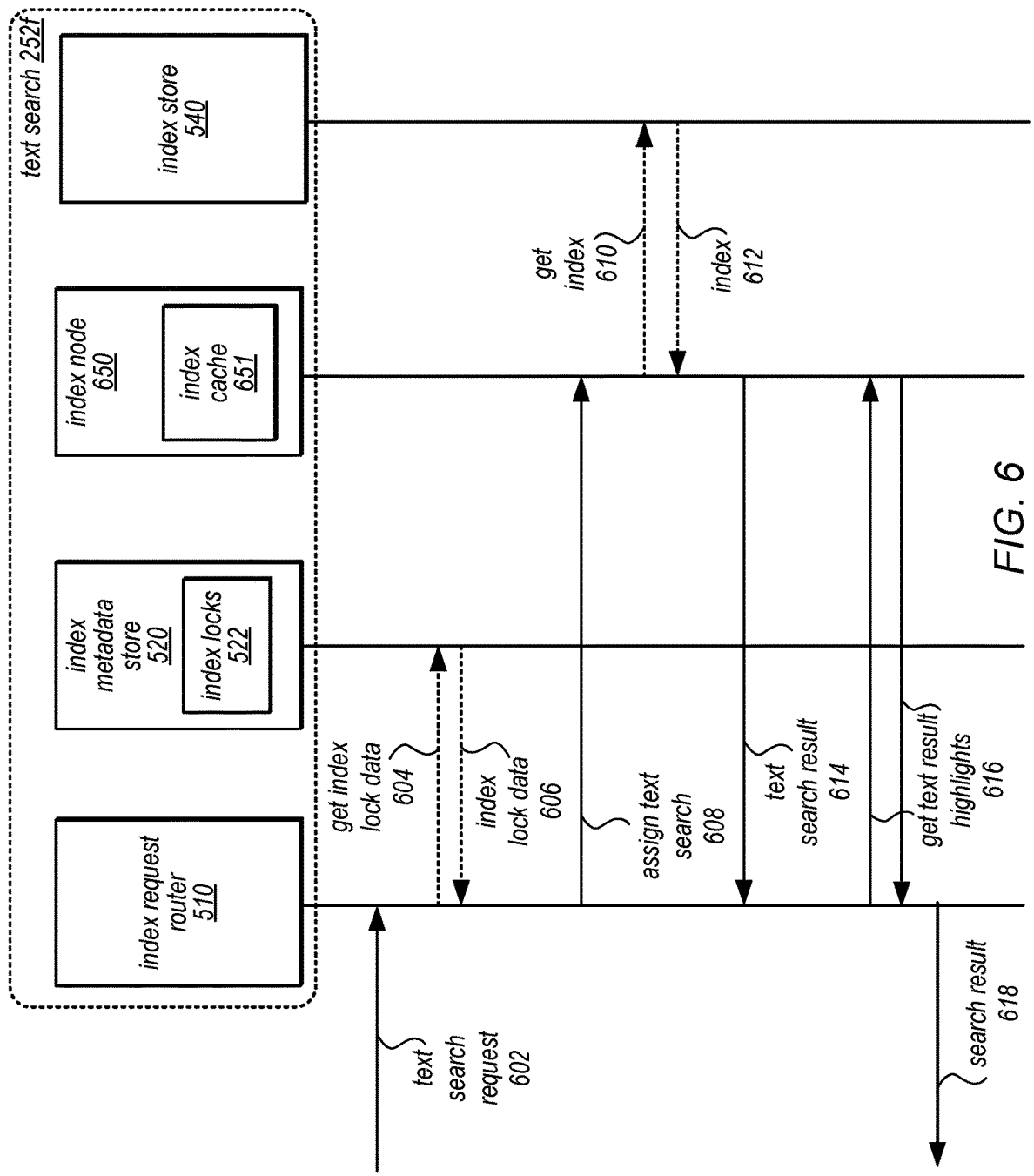
FIG. 6 is a sequence diagram text search requests across multi-tenant index nodes, according to some embodiments.

FIG. 6 is a sequence diagram text search requests across multi-tenant index nodes, according to some embodiments. As indicted at 602, a text search request may be received. Index request router 510 may send a request to get index lock data 604 (and other metadata) from index metadata store. Index metadata store 520 may return index lock data 606. Index request router 510 may then use that information to determine which index node to assign the text search request 602.

For example, if an index node has a current and valid lock, then that index node may have already obtained the inverted index. In some scenarios, no index node may have a lock on the index, which may allow index request router to randomly select an index node or to use a request assignment history to choose a node that was previously assigned a text search request. Index request router 510 may send the request to index node 650. If the inverted index for the user account is in index cache 651, then index node 650 can perform the search request on the cached inverted index. If not, then index node 650 may send request(s) to get the index 610 and cache the index received 612 received from index store. Index node may return a text search result 614 indicating documents (if any) that include the searched for text to index request router 510. Index request router 510 may return a search result 618. In some embodiments, index request router 510 may request text result highlights 616 (e.g., highlighted text portions of documents) which index request router 510 may provide as part of various search result processing techniques (e.g., to format, rank, order, or present search results in a single or paginated set of results).

The application build, development, delivery, and deployment service 210 discussed in FIGS. 2 through 6 provide examples of a system that may implement multi-tenant hosting of inverted indexes for text searches. However, various other types of deployment or development systems may implement such techniques as well as other services or distributed applications which may provide a text search feature for multiple different user accounts with varying text search workloads may take advantage of the above techniques of multi-tenant hosting of inverted indexes in order to right-size the computing resources used for performing text searches.

Figure 7:
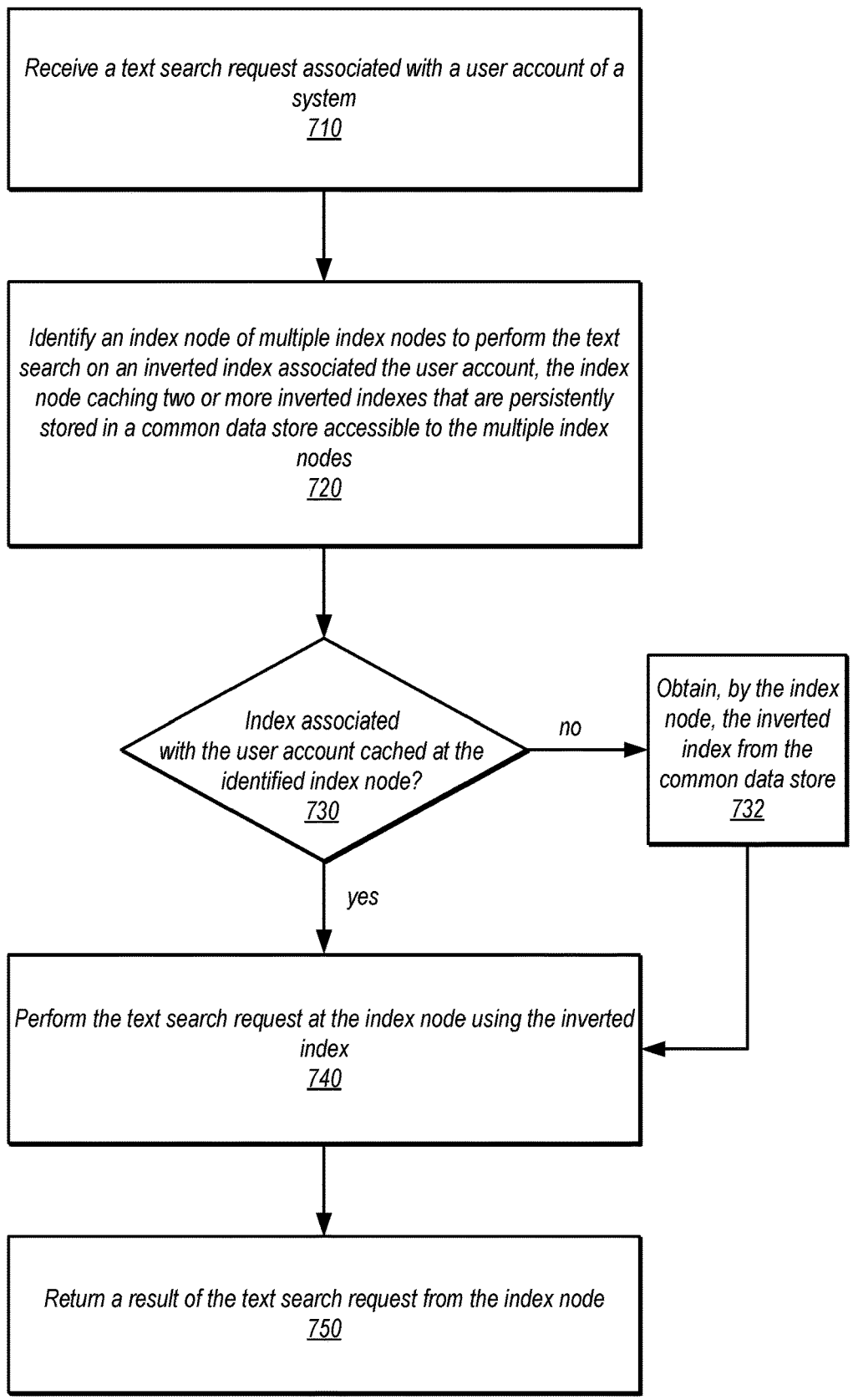
FIG. 7 is a high-level flowchart illustrating various methods and techniques that implement multi-tenant hosting of inverted indexes for text searches, according to some embodiments.

FIG. 7 is a high-level flowchart illustrating various methods and techniques that implement multi-tenant hosting of inverted indexes for text searches, according to some embodiments. Various different systems and devices may implement the various methods and techniques described below, either singly or working together. For example, an application build, development, delivery, and deployment service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 710, a text search request may be received that is associated with a user account of a system, in some embodiments. For example, the text search request may include as features or parameters one or more desired words, phrases, and/or portions of text to search for in different documents, schemas, code files, or other data objects that include human-readable and/or machine-readable text. A user identifier or some other credential may be used to determine the associated user account for the text search request. In some embodiments, the search request may include a consistency or version parameter (e.g., an indication that a most recent or current version of the index be searched as opposed to an eventually consistent version of the index).

As indicated at 720, an index node of multiple index nodes may be identified to perform the text search on an inverted index associated with the user account. As discussed above with regard to FIG. 1, index nodes may be multi-tenant, storing inverted indexes for multiple different user accounts. These inverted indexes may be encrypted according to a user account specific encryption (e.g., index A for user account A may be encrypted according to an encryption key for user account A, while index B for user account B may be encrypted according to a different encryption key for user account B, and so on). Also noted above, inverted indexes for user accounts may be persistently maintained in a separate data store that is accessible to all index nodes.

Identification of an index node may be performed in different ways. For example, as discussed above with regard to FIGS. 5 and 6, if node has a lock because it is updating (or has updated) the inverted index, then that index node may be selected. Or, a random selection of index nodes may be performed, or an assignment history may be used to send the search request to a last searched index node.

As indicated at 730, a determination may be made as to whether index associated with the user account is cached at the identified index node, in some embodiments. For example, the index node may maintain a cache map or index that can indicate whether an index is present. If not, then as indicated at 732, the index node can obtain the inverted index from the common data store. For example, the index may be stored in multiple objects, files, or other partitions which may be retrieved in parallel. As the search may be accessed in specific locations for specific words, phrases, or other portions of text, in some embodiments, the objects or files that are obtained may be searched when received (e.g., the entire index does not have to be obtained in order to begin performing the search). In some embodiments, a locality sensitive partition technique (e.g., locality sensitive hashing) may be used so that similar entries in the inverted index (e.g., similar words) are located in the same partition, which may make for faster searching when a single partition may contain all the words needed to be searched for the request.

As indicated at 740, the inverted index may be used to perform the text search at the index node using the inverted index, in some embodiments. If obtained from the common data store, as indicated at 732, then the inverted index may be decrypted. For example, the encryption key for the user account may be used to read and evaluate the inverted index in order to determine whether a data object matches the requested text. Note that the inverted index may remain encrypted in the common data store when "at rest." As indicated at 750, a result of the text search request may be returned from the index node. For example, a list of data object identifiers that match the text (if any) may be returned. Various result processing techniques may be implemented, including, but not limited to, highlighting or indicating matching portions of text searched for by the text search request, ranking resources, or other techniques to format, arrange, or present search results across one (or more) pages.

Figure 8:
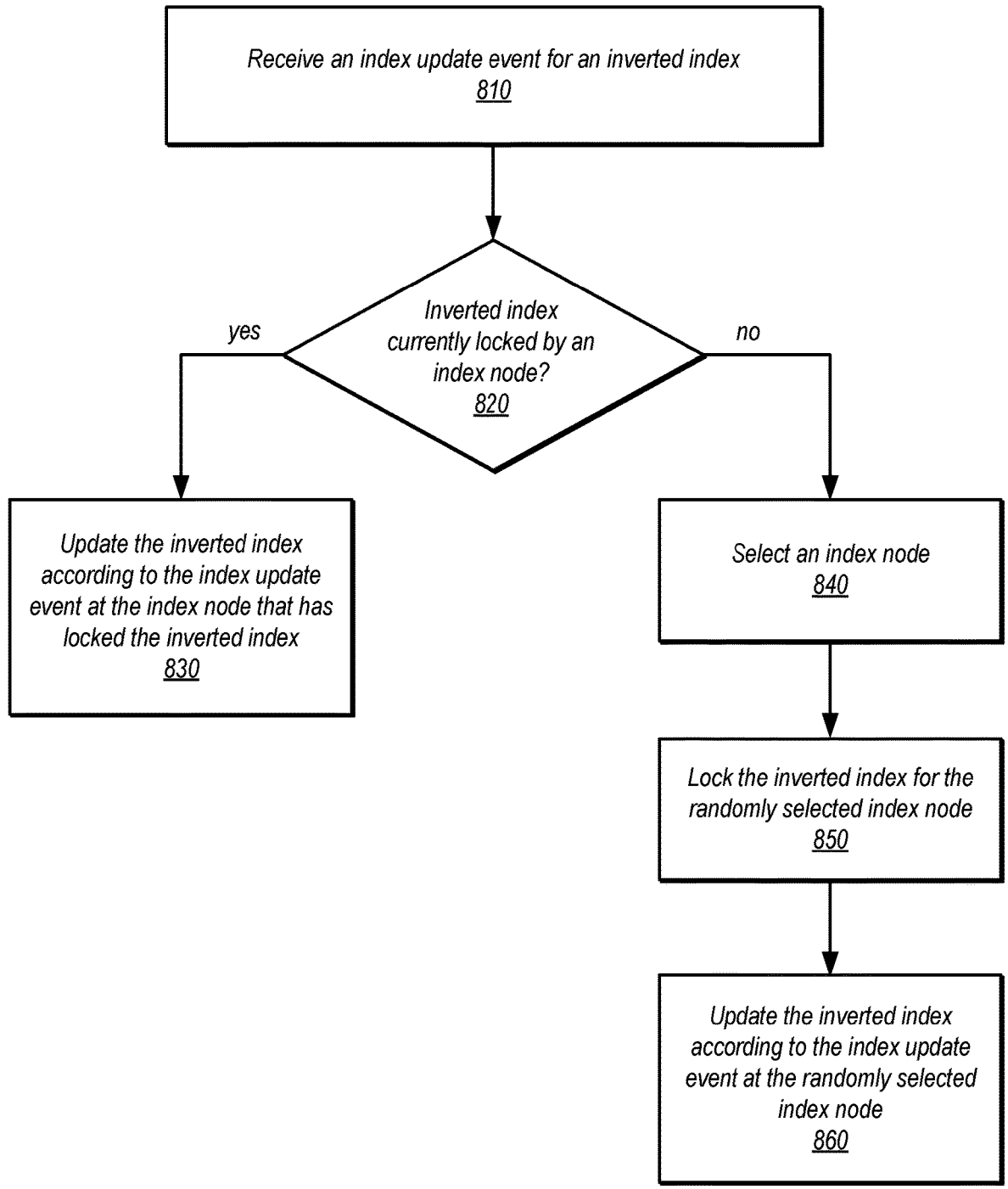
FIG. 8 is a high-level flowchart illustrating various methods and techniques that implement updating inverted indexes with multi-tenant, according to some embodiments.

FIG. 8 is a high-level flowchart illustrating various methods and techniques that implement updating inverted indexes with multi-tenant, according to some embodiments. As indicated at 810, an index update may be received for an inverted index. For example, the index update may include the identity of the document and the contents of the update (e.g., a new document, a removed document, a modified document, etc.). As indicated at 820 a determination may be made as to whether an inverted index is currently locked by an index node. For example, a lock field or attribute in a data store or distributed lock manager may identify a holder of a lock on an inverted index. If the lock is valid (e.g., has not expired or otherwise not been renewed within a threshold period of time), then the index node that holds the lock may be identified to perform the update to the inverted index according to the index update event, as indicated at 830. For example, the index node may obtain different versions of the data object (or a new data object) to determine what is the new or modified data to index, determine which entries in the inverted index to modify (e.g., add or remove the document identifier), and send update requests to the common data store, as well as make changes in the cached version of the inverted index.

If the inverted index is not locked, then as indicated at 840 an index node may be selected, in some embodiments. For example, a request to perform an index update may be sent random group of nodes and a first node to accept the update may be assigned in the index update. In some embodiments, a round-robin selection technique that rotates selections among index nodes may be used. In some embodiments, utilization or other workload based selection techniques (e.g., selecting an index node with a lowest number or amount of inverted indexes stored at an index node), in some embodiments.

As indicated at 850, the randomly selected index node may lock the inverted index (e.g., by performing a write or update to the lock metadata). Then, as indicated at 860, the index node may update the inverted index according to the index update event, in some embodiments. For example, the index node may obtain different versions of the data object (or a new data object) to determine what is the new or modified data to index, determine which entries in the inverted index to modify (e.g., add or remove the document identifier), and send update requests to the common data store, as well as make changes in the cached version of the inverted index.

Figure 9:
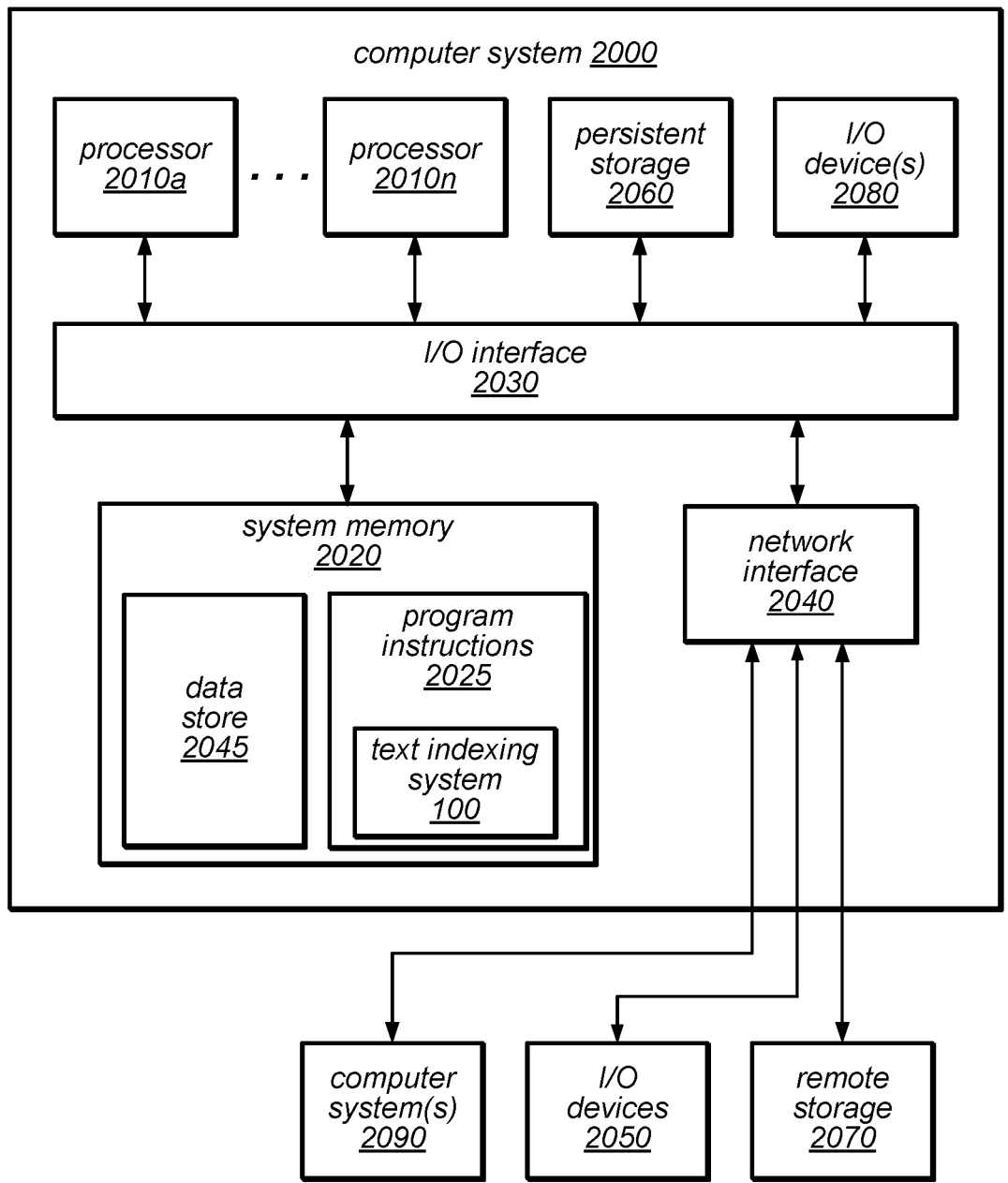
FIG. 9 is a block diagram illustrating an example computer system, according to various embodiments.

Any of various computer systems may be configured to implement multi-tenant hosting of inverted indexes for text searches as discussed with regard to the various figures above. FIG. 9 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for text indexing system 100, for the downloadable software or provider network are shown stored within system memory 2020 as program instructions 2025. In some embodiments, system memory 2020 may include data store 2045 which may be configured as described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a common data store, accessible to a plurality of multi-tenant, index nodes that persistently store a plurality of inverted indexes describing text present in a plurality of data objects associated with different user accounts, wherein the plurality of inverted indexes are encrypted in the common data store according to associated ones of the different user accounts;
   the plurality of multi-tenant, index nodes, that cache different ones of the plurality of inverted indexes; and
   a request router, comprising a comprising a processor and a memory, configured to:
     receive a text search request associated with a first user account of the different user accounts;
     identify a first index node of the plurality of multi-tenant, index nodes to perform the text search request on a first inverted index associated with the first user account based, at least in part, on index lock data tracked for the plurality of multi-tenant index nodes; and
     route the text search request to the first index node to perform the text search request using the first inverted index and return a result of the text search request.

2. The system of claim 1, wherein the first index node obtains the first inverted index from the common data store after being routed the text search request.

3. The system of claim 1, the request router is further configured to:
   receive an index update event for a second inverted index of the plurality of inverted indexes;
   identify a second multi-tenant index node of the plurality of multi-tenant index nodes that holds a current lock on the second inverted index; and
   cause the second, multi-tenant index node to update the second inverted index according to the index update event.

4. The system of claim 1, wherein the plurality of data objects are stored as part of an application development, build, delivery, and deployment service offered as part of a provider network.

5. A method, comprising:
receiving a text search request associated with a first user account of a plurality of user accounts of a system, wherein the system stores a plurality of data objects associated with individual ones of the plurality user accounts;
identifying a first index node of a plurality of index nodes to perform the text search request on a first inverted index associated with the first user account based, at least in part, on index lock data tracked for the plurality of multi-tenant index nodes, wherein the first index node caches two or more inverted indexes of a plurality of inverted indexes for the plurality of data objects, wherein the first inverted index is one of the plurality of inverted indexes, wherein the plurality of inverted indexes are persistently stored in a common data store accessible to the plurality of index nodes, and wherein the plurality of inverted indexes are respectively encrypted in the common data store according to associated ones of the plurality of user accounts;
performing the text search request at the first index node using the first inverted index; and
returning a result of the text search request from the first index node.

6. The method of claim 5, wherein the text search request includes a consistency parameter for a current version of the first inverted index, and wherein identifying the first index node of the plurality of index nodes to perform the text search request comprises determining according to the index lock data that the first index node holds a lock to update the first inverted index.

7. The method of claim 5, wherein the first index node obtains the first inverted index from the common data store after being routed the text search request and decrypts the first inverted index obtained from the common data store to perform the text search request.

8. The method of claim 5, wherein the first index node obtained the first inverted index from the common data store before being routed the text search request.

9. The method of claim 5, further comprising:
receiving an index update event for a second inverted index of the plurality of inverted indexes;
identifying a second index node of the plurality of index nodes that holds a current lock on the second inverted index according to the index lock data; and updating the second inverted index according to the index update event at the second index node.

10. The method of claim 9, wherein index update event indicates an update to an existing data object associated with the first user account.

11. The method of claim 5, further comprising:
receiving an index update event for a second inverted index of the plurality of inverted indexes;
determining that the second inverted index is not currently locked according to the index lock data;
selecting a different one of the plurality of index nodes;
locking, in the index lock data, the second inverted index for the selected index node; and
updating the second inverted index according to the index update event at the randomly selected index node.

12. The method of claim 11, wherein determining that the second inverted index is not currently locked comprises determining that previous lock held by a third index node expired.

13. The method of claim 5, wherein the plurality of data objects are stored as part of an application development, build, delivery, and deployment service offered as part of a provider network.

14. One or more non-transitory, computer-readable storage media, storing program instructions that when executed on or across one or more computing devices cause the one or more computing devices to implement:
receiving a text search request associated with a first user account of a plurality of user accounts of a system, wherein the system stores a plurality of data objects associated with individual ones of the plurality user accounts;
identifying a first index node of a plurality of index nodes to perform the text search request on a first inverted index associated with the first user account based, at least in part, on index lock data tracked for the plurality of multi-tenant index nodes, wherein the first index node caches two or more inverted indexes of a plurality of inverted indexes for the plurality of data objects, wherein the first inverted index is one of the plurality of inverted indexes, wherein the plurality of inverted indexes are persistently stored in a common data store accessible to the plurality of index nodes, and wherein the plurality of inverted indexes are respectively encrypted in the common data store according to associated ones of the plurality of user accounts; and
causing the first index node to perform the text search request at the first index node using the first inverted index and return a result of the text search request.

15. The one or more non-transitory, computer-readable storage media of claim 14, wherein the first index node obtains the first inverted index from the common data store after being routed the text search request and decrypts the first inverted index obtained from the common data store to perform the text search request.

16. The one or more non-transitory, computer-readable storage media of claim 14, wherein the first index node obtained the first inverted index from the common data store before being routed the text search request.

17. The one or more non-transitory, computer-readable storage media of claim 14, storing further instructions that when executed on or across the one or more computing devices, cause the one or more computing devices to further implement:
receiving an index update event for a second inverted index of the plurality of inverted indexes;
identifying a second index node of the plurality of index nodes that holds a current lock on the second inverted index according to the index lock data; and
causing the second index node to update the second inverted index according to the index update event.

18. The one or more non-transitory, computer-readable storage media of claim 17, wherein index update event indicates a new data object associated with the first user account.

19. The one or more non-transitory, computer-readable storage media of claim 14, wherein the result of text search request includes one or more highlighted portions of data objects that include requested text.

20. The one or more non-transitory, computer-readable storage media of claim 14, wherein the plurality of data objects are stored as part of an application development, build, delivery, and deployment service offered as part of a provider network.

\* \* \* \* \*